United States Patent
Shi

(10) Patent No.: US 8,170,160 B1
(45) Date of Patent: May 1, 2012

(54) MULTI-SYMBOL PHASE OFFSET ESTIMATION

(75) Inventor: Kai Shi, Sunnyvale, CA (US)

(73) Assignee: Qualcomm Atheros, Inc., San Jose, CA (US)

( * ) Notice: Subject to any disclaimer, the term of this patent is extended or adjusted under 35 U.S.C. 154(b) by 737 days.

(21) Appl. No.: 12/273,713

(22) Filed: Nov. 19, 2008

(51) Int. Cl.
*H04L 1/00* (2006.01)
(52) U.S. Cl. ........................................ 375/347
(58) Field of Classification Search ........... 375/259, 375/260, 316, 346, 347
See application file for complete search history.

(56) References Cited

U.S. PATENT DOCUMENTS

| | | | | |
|---|---|---|---|---|
| 7,486,751 B1 * | 2/2009 | Pare et al. | ..................... | 375/347 |
| 2002/0054632 A1 * | 5/2002 | Chuang et al. | ................ | 375/224 |
| 2003/0128751 A1 * | 7/2003 | Vandenameele-Lepla | ... | 375/229 |
| 2007/0268976 A1 * | 11/2007 | Brink et al. | ................... | 375/260 |

* cited by examiner

*Primary Examiner* — Kevin M Burd
(74) *Attorney, Agent, or Firm* — DeLizio Gilliam, PLLC

(57) ABSTRACT

Receivers typically detect the presence of a pilot tone, transmitted as part of an RF signal, and use the pilot tone as a reference to detect symbols in the received RF signal. However, improper synchronization between the transmitter and the receiver units can result in timing offset and carrier frequency offset in the digitized received RF signal, impair the orthogonality between OFDM sub-carriers, and cause inter-carrier interference. Phase offsets caused by carrier frequency offset and timing offset can also degrade receiver performance. Functionality can be incorporated to estimate the phase offset over multiple symbols. Estimating the phase offset over multiple symbols in the received RF signal can lower the error rate. Correcting the phase offset in the received RF signal can ensure accurate sampling of the received signal, accurate channel estimates, and accurate decoding of the digitized received signal. This can minimize receiver performance degradation.

18 Claims, 7 Drawing Sheets

MULTI-SYMBOL PHASE OFFSET ESTIMATION

BACKGROUND

Embodiments of the inventive subject matter generally relate to the field of wireless communication networks, and more particularly, to techniques for phase offset estimation with multiple symbols.

Wireless communication systems can use one or more channels to transfer data between a transmitter and receivers. These communication systems can operate according to a set of standards, defined by the Institute of Electrical and Electronics Engineers (IEEE) 802.11 committee, for Wireless Local Area Network (WLAN) communication. The 802.11 standards provide a modulation and coding scheme, a packet format, and other aspects for wireless transmission. Conforming to the 802.11 standards minimizes interference between transmitting devices (e.g., cellular phones). The 802.11n standard is a proposed amendment to the 802.11 standard and is further described in FIG. 1. The 802.11n amendment addresses multiple input multiple output (MIMO) communication for increased network throughput.

FIG. 1 illustrates an example format of a packet transmitted in a MIMO environment. As shown in FIG. 1, the packet typically includes a preamble 102 and a payload 108. In some cases, multiple transmit antennas may transmit packets with the same (duplicated) preamble and a different payload. In other cases, multiple antennas may transmit packets with a different preamble and payload.

The preamble 102 comprises a signal field 103, short training fields (STF) 104, and long training fields (LTF) 106. The signal field 103 comprises information used for interpreting packet formats. For example, the signal field 103 can indicate the packet's modulation and coding scheme, bandwidth (e.g., 20 MHz, 40 MHz), number of data bytes in the payload, additional coding schemes (e.g., LDPC coding, STBC coding, etc.), number of LTFs, cyclic redundancy check (CRC) information, etc. The STF (104) can be 4 microseconds long and can be used for automatic gain control (AGC) training in a MIMO system. In some cases, the STF (104) may also be used for packet detection.

The LTFs 106 can include one to four LTF symbols. In FIG. 1, the LTF training field 106 comprises four LTF symbols 110, 111, 112, and 113. Each of the LTF symbols (e.g., 110) may be 4 microseconds long and may include training bits and a guard interval. The LTF symbols (e.g., 110) can be used for carrier frequency offset estimation and channel estimation. The number of transmitted LTF symbols can depend on the number of space-time streams (which may be related to the number of transmit chains). In some instances, the number of transmitted LTF symbols (e.g., 110) is equal to the number of space-time streams (except in the case of 3 space-time streams, where four LTFs are transmitted). In other instances, the number of transmitted LTF symbols may be greater than the number of space-time streams. For example, four LTF symbols may be transmitted for a single space-time stream. Because the LTFs 106 may be used to estimate the channel, the number of transmitted LTF symbols may not be less than the number of space-time streams. Thus, for each transmit chain, at least one LTF symbol is transmitted. As shown in FIG. 1, four LTF symbols (110, 111, 112, and 113) are transmitted for four space-time streams.

The payload 108 comprises data symbols, a service field (used for scrambler initialization), pad bits, tail bits (e.g., to indication the end of transmission), etc. It should be noted that the packet format described in FIG. 1 is exemplary. The number and length of STF, LTF, and signal fields and their order of occurrence in the packet may vary, e.g., depending on the mode of operation. 802.11n systems can operate in a variety of modes (e.g., Green Field mode) to enable backward compatibility with systems using 802.11a/b/g standards.

Data to be transmitted in an 802.11n format may be split into two or more data streams and fed into multiple transmit chains. Each of the transmit chains can modulate the data stream using orthogonal frequency division multiplexing (OFDM). In OFDM, the transmit chain modulates the data stream with one of multiple orthogonal OFDM sub-carriers (also called a frequency bin) using any suitable modulation scheme (e.g., quadrature amplitude modulation (QAM), binary phase shift keying (BPSK), etc). The orthogonality of the OFDM sub-carriers ensures simultaneous transmission of closely spaced sub-carriers without interference. The transmit chains may further process the modulated data streams and convert them into radio frequency (RF) signals. Transmit antennas then transmit the modulated data streams through a communication channel. Typically, transmit antennas also transmit a "pilot tone" for each OFDM sub-carrier. A pilot tone is a single frequency transmitted for synchronization and reference purposes.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. In some instances, well-known instruction instances, protocols, structures, and techniques have not been shown in detail in order not to obfuscate the description.

Transmitted RF signals modulated using OFDM, are generally resistant to interference caused by multipath fading. After the transmitted RF signals travel through the communication channel, they are received by a receiver unit (e.g., a transceiver of a WLAN device) comprising one or more receive chains. The receive chains may detect the presence of a pilot tone and use the pilot tone as a reference to detect data symbols in the received RF signal. However, a slight difference between crystal frequency generators on the transmitter and on the receiver units can result in timing offset and carrier frequency offset in the received RF signal. Timing and carrier frequency offset can lead to incorrect sampling of the received signal, non-orthogonal received symbols, inaccurate channel estimates, and incorrect decoding of the digital received signal. Phase offsets caused by carrier frequency offset and timing offset can also degrade receiver performance. Correcting the phase offset caused by timing and carrier frequency offset in the digitized received RF signal (i.e., digitized received signal) can ensure that the decoded symbols are accurate. Estimating phase offset over multiple symbols in the digitized received signal can lower the error rate. This can minimize receiver performance degradation.

Figure 2:
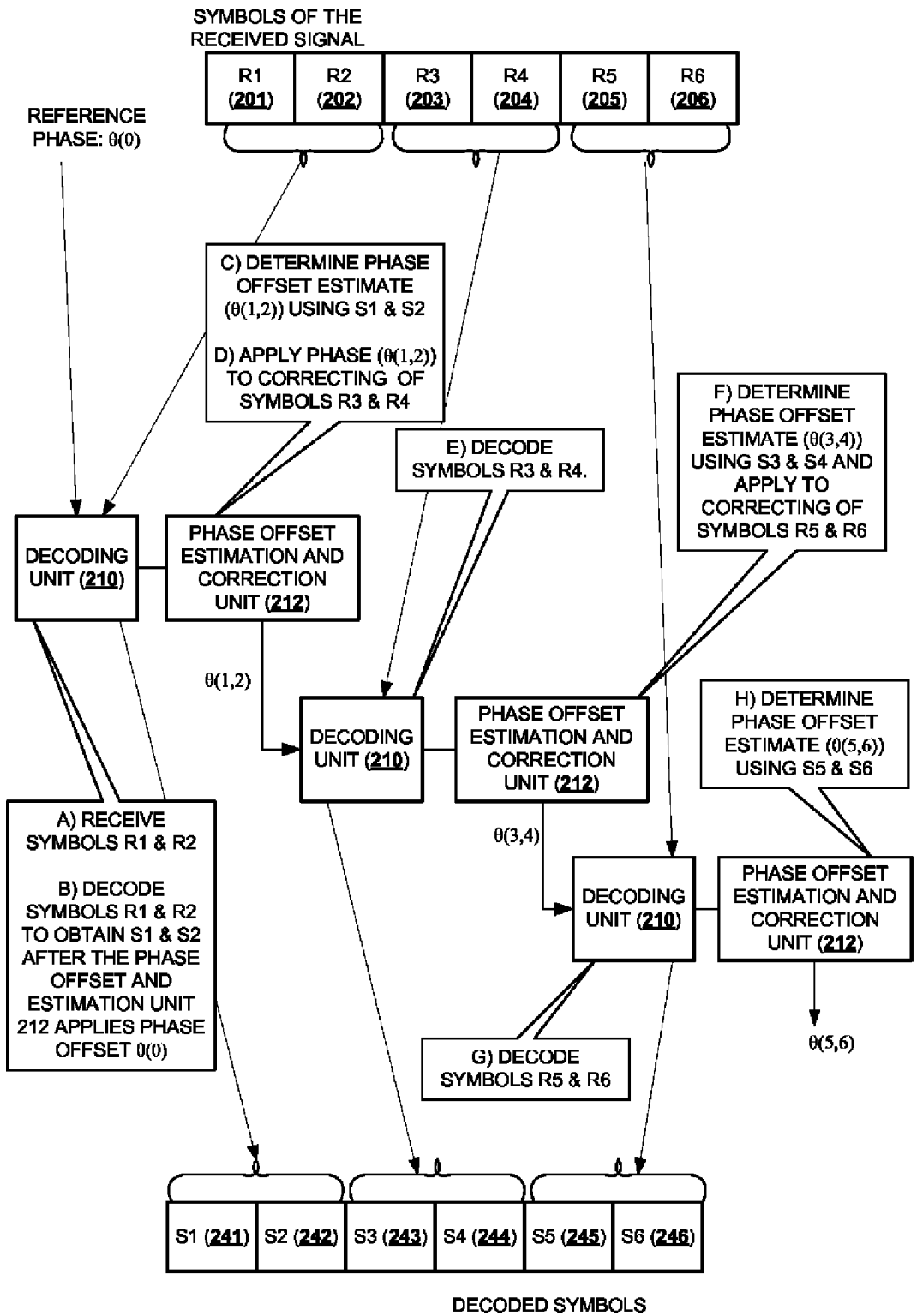
FIG. 2 is a conceptual diagram illustrating operations for phase offset estimation and correction.

FIG. 2 is a conceptual diagram illustrating operations for phase offset estimation and correction. In FIG. 2, a decoding unit 210 is coupled with a phase offset estimation and correction unit 212. The decoding unit 210 and the phase offset estimation and correction unit 212 process six symbols R1 (201) through R6 (206) of a digitized received signal. At stage A, the decoding unit 210 receives symbols R1 (201) and R2 (202). At stage B, the phase offset estimation and correction unit 212 applies a first reference phase offset, θ (0) to correct the symbols R1 (201) and R2(202), and the decoding unit 210 decodes the corrected received symbols R1 (201) and R2 (202). The decoded symbols are S1 (241) and S2 (242). The reference phase offset, θ (0), can be zero or an approximate phase offset determined using simulations. At stage C, the phase offset estimation and correction unit 212 uses the decoded symbols S1 (241) and S2 (232) to determine a second phase offset (θ (1,2)).

Next, the decoding unit 210 receives symbols R3 (203) and R4 (204) of the digitized received signal. At stage D, the phase offset estimation and correction unit 212 applies the phase offset estimate (θ (1,2)), which was determined using the two previous decoded symbols (S1 (241) and S2 (232)), to the correcting of symbols R3 (203) and R4 (204). At stage E, the decoding unit 210 decodes the corrected received symbols and generates decoded symbols S3 (243) and S4 (244). At stage F, the phase offset estimation and correction unit 212 uses the decoded symbols S3 (243) and S4 (244) and determines a third phase offset (θ (3,4)) that is based on the decoded symbols S3 (243) and S4 (244). The phase offset estimation and correction unit 212 also applies the third phase offset (θ0 (3,4)) to the correcting of symbols R5 (205) and R6 (206).

Lastly, at stage G, after the phase offset estimation and correction unit 212 applies the third phase offset (θ (3,4)) to symbols R5 (205) and R6 (206), the decoding unit 210 decodes the corrected received symbols R5 (205) and R6 (206). The decoding unit 210 generates decoded symbols S5 (245) and S6 (246). The phase offset estimation and correction unit 212 determines a fourth phase offset (θ (5,6)) based on the decoded symbols S5 (245) and S6 (246). The fourth phase offset (θ (5,6)) may be used to decode the next two received symbols following symbol R6 (206).

Figure 3:
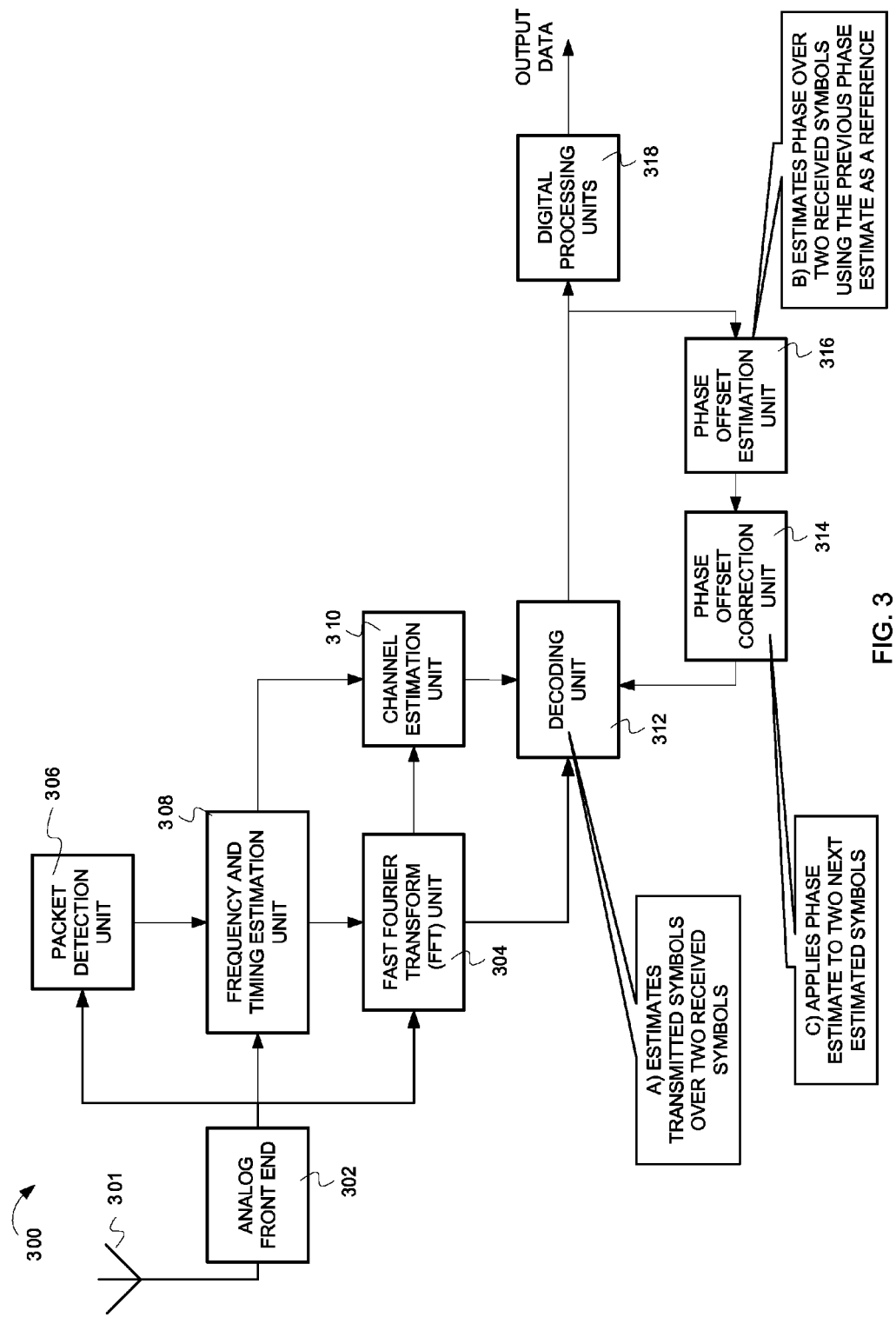
FIG. 3 is a block diagram of an example receiver unit configured to estimate and correct phase offset with multiple symbols.

FIG. 3 is a block diagram of an example receiver unit 300 configured to estimate and correct phase offset with multiple symbols. As shown in FIG. 3, the receiver unit 300, comprises a receive chain with an antenna 301 and an analog front end (AFE) 302. The AFE is coupled with a Fast Fourier Transform (FFT) unit 304, a packet detection unit 306, and a frequency and timing estimation unit 308. The packet detection unit 306 is coupled with the frequency and timing estimation unit 308, while the frequency and timing estimation unit 308 is coupled with the FFT unit 304 and a channel estimation unit 310. The outputs of the FFT unit 304 and the channel estimation unit 310 are fed into a decoding unit 312. The decoding unit 312 is coupled with a phase offset estimation unit 316 and digital processing units 318. The phase offset estimation unit 316 is coupled with a phase offset correction unit 314, which in turn, is coupled with the decoding unit 312.

At the receiver unit 300, the antenna 301 receives RF signals and provides the received RF signals to the analog front end 302. The received RF signal comprises a preamble and a payload. The preamble comprises training symbols (e.g., short training fields, long training symbols, etc.), while the payload comprises data symbols. The analog front end 302 can include 1) one or more amplifying stages to amplify the received RF signal, 2) one or more filtering stages to remove unwanted bands of frequencies, 3) mixer stages to down-convert the received RF signal, 4) an automatic gain control (AGC) unit to adjust the gain to an appropriate level for a range of received signal amplitude levels, 5) an analog to digital converter (ADC) to convert the received RF signal into a digital signal, etc. After the analog front end 302 processes and converts the received RF signal into its digital representation ("digitized received signal"), the FFT unit 304 converts the digitized received signal from the time domain to the frequency domain.

The packet detection unit 306 may use short training fields (STF) in the received signal's preamble to detect an incoming packet. The packet detection unit 306 can perform self-correlation on the digitized received signal, use a combination of cross correlation (with a known STF symbol) and self-correlation, or use any suitable method to detect the packet. The packet detection unit 306 detects the presence of a packet comprising data symbols and directs one or more of the other processing units to process the received packet.

After the packet detection unit 306 detects a packet, the frequency and timing estimation unit 308 uses the short training fields (STFs) and/or long training fields (LTFs) and estimates a carrier frequency offset and a timing offset in the digitized received signal. The frequency estimation and timing estimation unit 308 uses the determined offset estimates and corrects the carrier frequency and timing errors in the long training fields. The channel estimation unit 310 uses the corrected LTFs to estimate channel coefficients and channel response. Channel estimates describe the effect (attenuation, distortion, etc.) of the communication channel on RF signals that pass through the communication channel.

The decoding unit 312 uses the channel estimates and symbols of the frequency-domain digitized received signal (determined at the FFT unit 304) to estimate the transmitted symbols. As indicated at stage A, the decoding unit 312 uses multiple received symbols to estimate the transmitted data symbols. The received symbols may be training symbols (in the preamble) or data symbols (in the payload). The decoding unit 312 can use a combination of maximum ratio combining (MRC), zero forcing detection, STBC decombining, etc. to decode the multiple received symbols and generate estimates of the transmitted symbols. The phase offset estimation unit 316 uses the estimates of the transmitted symbols (determined by the decoding unit 312) and computes a phase offset based on the estimates of the transmitted symbols. At stage B, the phase offset estimation unit 316 estimates the phase offset over the multiple estimated transmitted symbols.

The phase offset correction unit 314 applies the estimated phase offset to the decoding of the two symbols following the symbols used to estimate the phase offset, as indicated at stage C. For example, the phase offset correction unit 314 applies the phase offset estimate determined using symbols 1 and 2 in the decoding of symbols 3 and 4.

From the decoding unit 312, symbols decoded based on a multi-symbol phase offset estimate flow into the digital processing units 318. The digital processing units 318 can include a demodulator, a deinterleaver, a decoder, and other digital components depending on the encoding applied before transmission.

Figure 1:
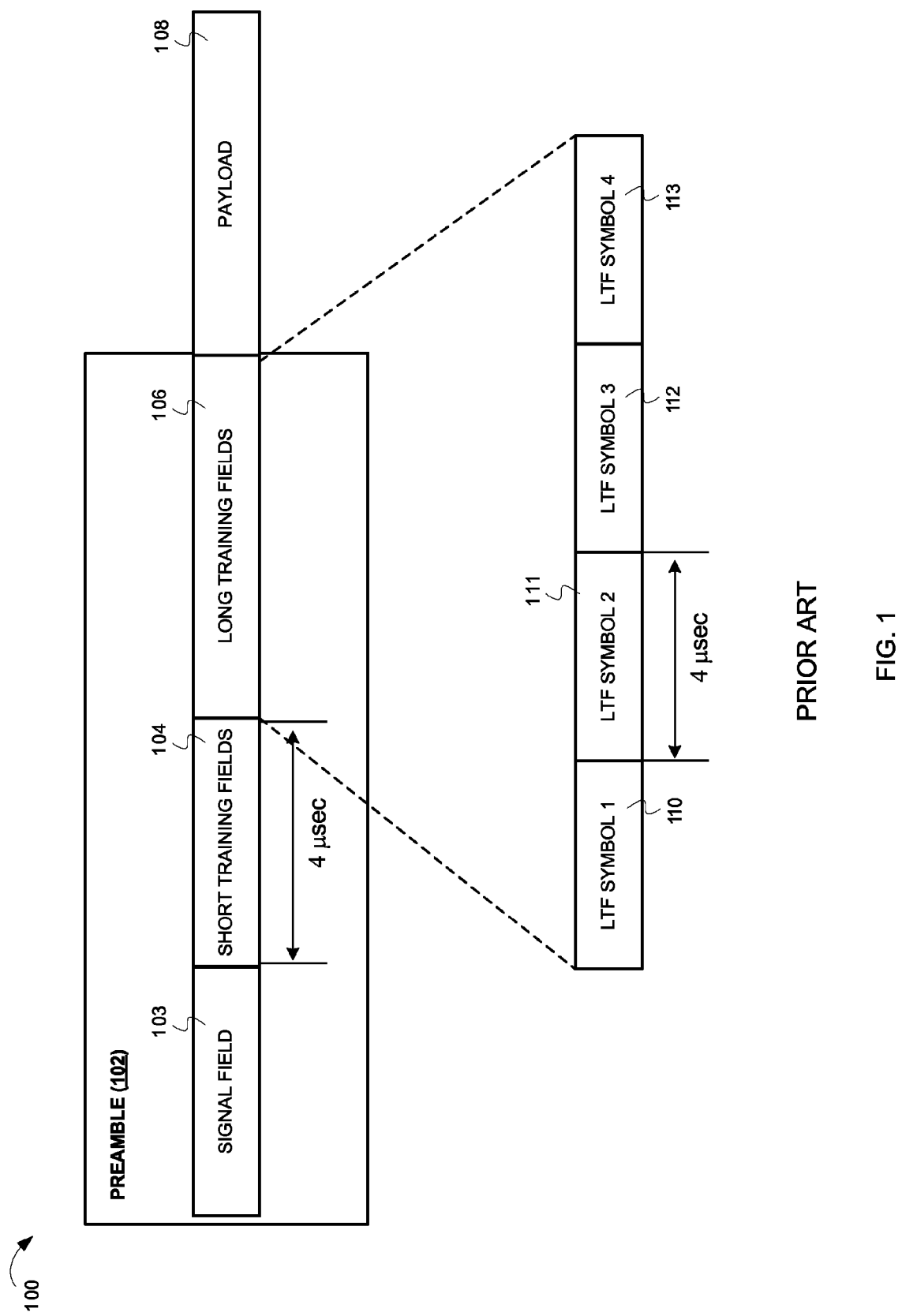
FIG. 1 illustrates an example format of a packet transmitted in a MIMO environment.

Although FIG. 3 is depicted with one receive chain, MIMO systems using 802.11n formats can comprise multiple receive antennas and receive chains. Each of the receive chains may independently perform channel estimation. Following channel estimation, the receive chains may be combined (e.g., using maximum ratio combining techniques) and joint packet detection, frequency and timing estimation, phase offset estimation, and equalization may be performed. In some instances, timing and carrier frequency offset estimation and correction may be performed on the preamble every time a new packet is detected. Channel estimation may also be performed when a new packet is received. In other instances, channel estimation may be performed after a pre-determined number of packets are received. As described in FIG. 1, the payload including data symbols follows the preamble. In some instances, the carrier frequency and timing offset estimates may be applied to the data symbols, while in other instances, the offset estimates may not be applied to the data symbols.

Figure 4:
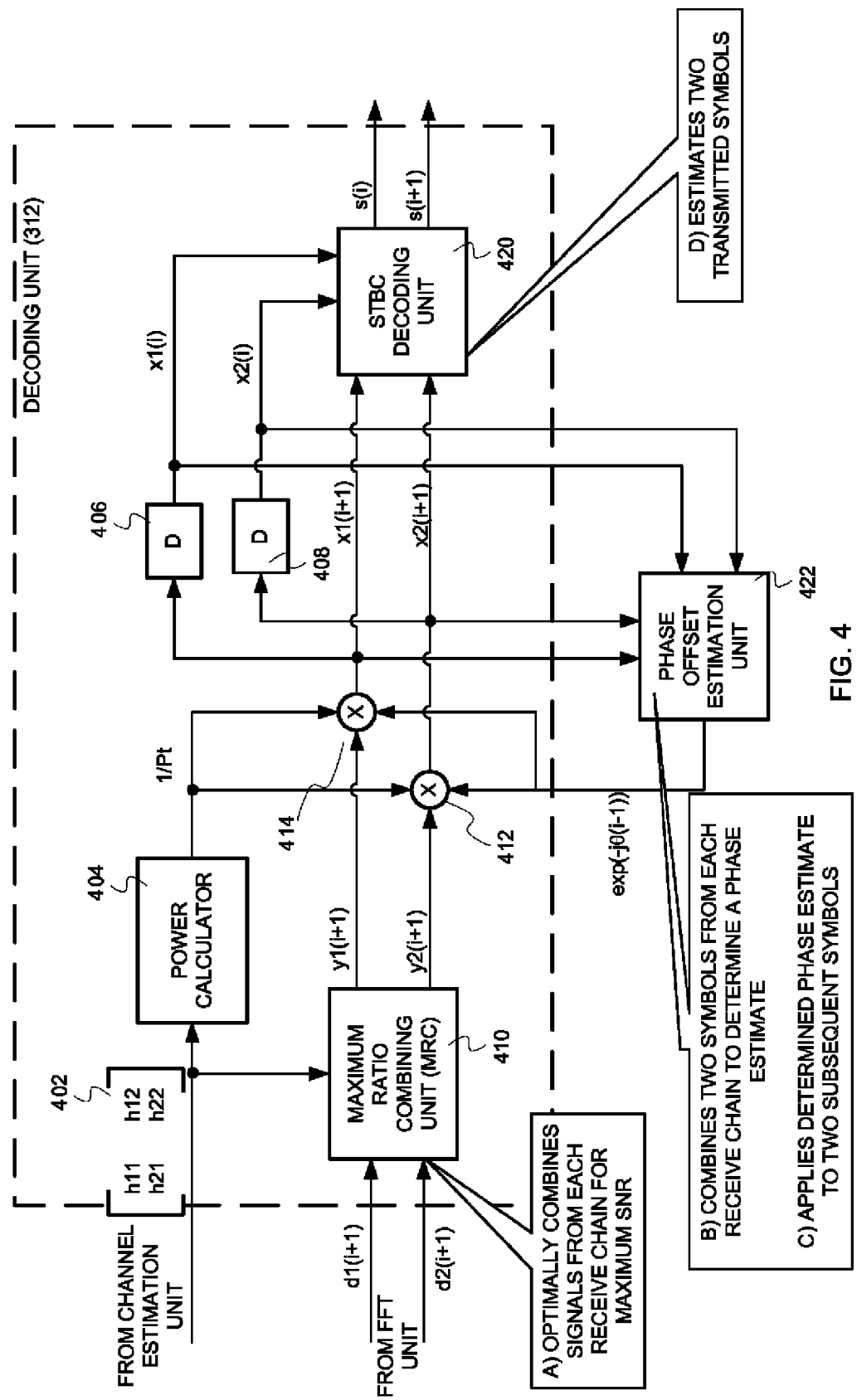
FIG. 4 is an example block diagram illustrating operations for phase offset estimation and correction in a two-transmitter, two-receiver scenario.

FIG. 4 is an example block diagram illustrating operations for phase offset estimation and correction in a two-transmitter, two-receiver scenario. In FIG. 4, a power calculator 404 receives channel estimates 402 from a channel estimation unit (not shown). A maximum ratio combining unit (MRC) 410 receives samples of a frequency domain digitized received signal from an FFT unit (not shown). The MRC unit 410, the power calculator 404, and a phase estimation unit are coupled with a first multiplier 414. The MRC unit 410, the power calculator 404, and a phase offset estimation unit are also coupled with a second multiplier 412. Multiplier 414 is coupled with a first delay unit 406, an STBC decoding unit 420, and the phase offset estimation unit 422. Likewise, multiplier 412 is coupled with a second delay unit 408, an STBC decoding unit 420, and the phase offset estimation unit 422. The delay units 406 and 408 are coupled with the STBC decoding unit 420. The delay units 406 and 408 are also coupled with the phase offset estimation unit 422.

The maximum ratio combining unit (MRC) 410 receives samples of the frequency domain digitized received signal from the FFT unit (not shown), and uses the channel estimates 402 to generate MRC outputs denoted by y1(i+1) and y2(i+1). The MRC unit 410 optimally combines symbols received by one or more receive chains in a receiver unit for maximum SNR (signal to noise ratio), indicated at stage A. In the two-receiver, two-transmitter scenario depicted in FIG. 4, the MRC unit 410 receives symbol d1 (i+1) from receive chain 1 and symbol d2(i+1) from receive chain 2. The MRC unit 410 combines the symbols by weighting each symbol such that the weight is proportional to the strength of the received signal. In some instances, the MRC unit 410 may use the channel estimates to determine a suitable weight. The MRC unit 410 generates an output for each receive chain and each symbol received by the receive chains. The MRC unit 410 operates on digitized received symbols d1(i+1) and d2(i+1) to generate symbols y1(i+1) and y2(i+1) respectively. The power calculator 404 uses the channel estimates 402 (h11, h12, h21, and h22) to determine the power (Pt).

Multiplier 414 multiplies MRC output y1(i+1) with an inverted output from the power calculator 404 (1/Pt), thus weighting the MRC output y1(i+1). The multiplier 414 also multiplies the weighted MRC output with a previous phase offset estimate, exp(−jθ(i−1)), from the phase offset estimation unit 422 to generate phase offset compensated symbol denoted by x1(i+1). Likewise, multiplier 412 multiplies MRC output y2(i+1) with the inverted output from the power calculator 404 (1/Pt), thus weighting the MRC output y2(i+1). The multiplier 412 also multiplies the weighted MRC output with the previous phase offset estimate, exp(−jθ(i−1)), from the phase offset estimation unit 422 to generate a phase offset compensated symbol denoted by x2(i+1). Delay units 406 and 408 respectively delay the outputs of the multipliers 414 and 412. The delay units 406 and 408 then feed the delayed outputs to an STBC decoding unit 420. The STBC decoding unit 420 also takes, as an input, the outputs of multipliers 414 and 412.

The STBC decoding unit 420 takes, as an input, two consecutive symbols from each receive chain. Therefore, delay units 406 and 408 delay the compensated MRC output symbols. FIG. 4 depicts the STBC decoding unit 420 receiving four symbols as inputs—two delayed symbols (symbols x1(i) and x2(i)) and two current symbols (i.e., symbol x1(i+1) from multiplier 414 and symbol x2(i+1) from multiplier 412). At stage B, the phase offset estimation unit 422 also takes the four symbols as inputs—the two delayed symbols (x1(i), x2(i)) and the two current symbols (x1(i+1) from multiplier 414 and x2(i+1) from multiplier 412). The phase offset estimation unit 422 combines the four symbols and determines an angle of the combined symbols to estimate a phase offset.

At stage C, the phase offset estimation unit 422 applies the determined phase offset estimate, to the two subsequent symbols from each receive chain. For example, the phase offset estimation unit 422 determines a first phase offset estimate θ(i−1) using symbols x1(i−1), x2(i−1), x1(i−2) and x2(i−2). The phase offset estimate θ(i−1) is applied to symbols y1(i), y2(i), y1(i+1) and y2(i+1) from the MRC unit 410 to respectively generate symbols x1(i), x2(i), x1(i+1) and x2(i+1). The symbols x1(i), x2(i), x1(i+1) and x2(i+1) are then fed to the STBC decoding unit 420 and the phase offset estimation unit 422. The phase offset estimation unit 422 uses symbols x1(i), x2(i), x1(i+1) and x2(i+1) and generates a second phase offset which may be used in the decoding of symbols i+2 and i+3 from each receive chain. At stage D, the STBC decoding unit 420 combines the four symbols (i.e., x1(i), x2(i), x1(i+1) and x2(i+1) and estimates two transmitted symbols s(i+1) and s(i).

Although FIG. 4 describes the phase offset estimation and correction operations over two symbols, phase offset estimation and phase offset correction can be performed over any suitable number of symbols. The number of symbols over which phase offset estimation and correction is performed may be limited by the rate at which the phase noise changes over time. Phase offset can comprise phase rotation and phase noise. The sampling clock frequency offset and carrier frequency offset, can cause monotonic phase rotation over sub-carriers within one OFDM symbol and over multiple OFDM symbols. A slight difference between the crystal frequency generator on the receiver and transmitter may cause both carrier and sampling clock frequency offset. Estimating and correcting phase offset comprises estimating and correcting phase noise and phase rotation. If the carrier frequency and the digital clock are tied to the same crystal, the phase rotation caused by timing offset may be estimated from the carrier frequency offset estimate. In some variations, local oscillators and digital clocks are shared by all transmit and receive chains. Therefore, the phase offsets caused by the carrier frequency offset and timing offset are identical in all the receive chains. It is possible, in other variations, for different transmit chains and receive chains to have different local oscillators and digital clocks.

Figure 5:
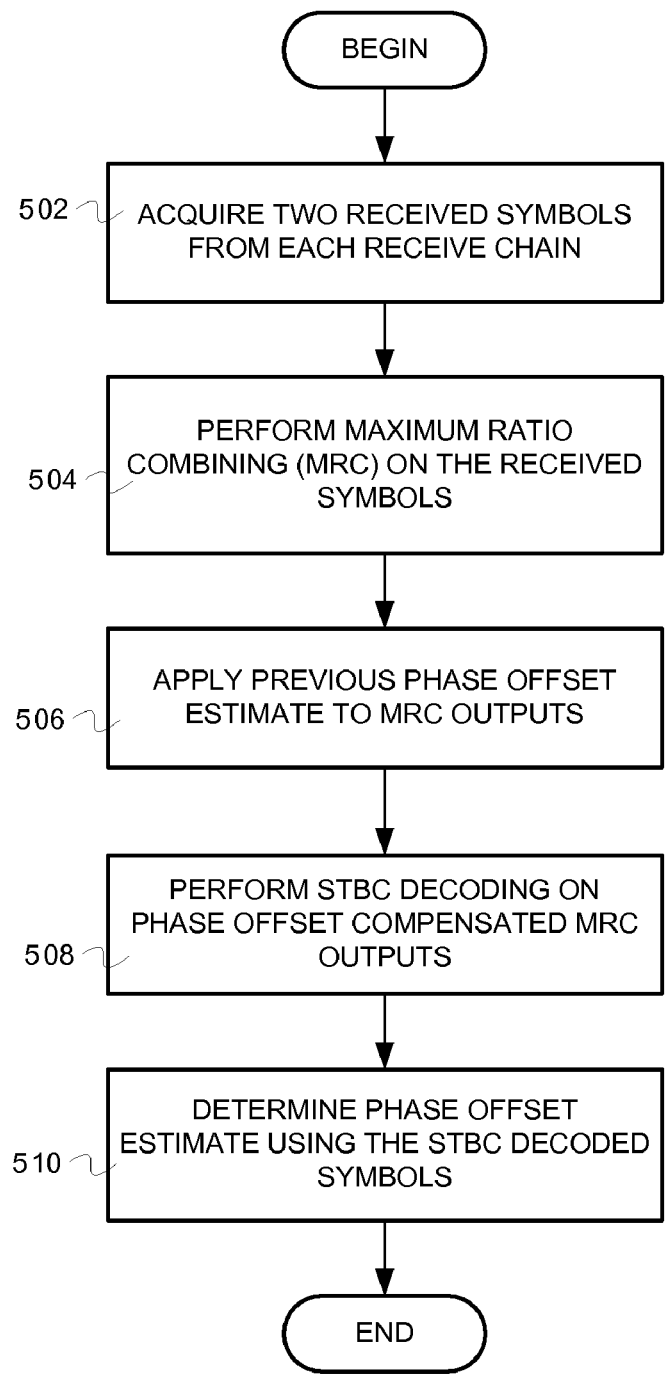
FIG. 5 is a flow diagram illustrating example operations for bi-symbol phase offset estimation and correction.

FIG. 5 is a flow diagram illustrating example operations for bi-symbol phase offset estimation and correction. The flow 500 begins at block 502.

At block 502, estimates for two received symbols are acquired from each receive chain. In some implementations, when STBC encoding is used at the transmitter, the received symbol estimates can be acquired from an STBC decoding unit at the receiver. STBC encoding, defined by the 802.11n specification, describes how two or more symbols may be combined and encoded. Encoding pilot tones is similar to multiplication by an encoding matrix ($P_{encoding}$). For example, in a two-transmitter two-receiver scenario, the encoding matrix can be represented by Eq. 1.

$$P_{encoding} = \begin{bmatrix} 1 & 1 \\ 1 & -1 \end{bmatrix} \qquad \text{Eq. 1}$$

Alternately, the encoding matrix can also be a rotated version of the matrix in Eq. 1. In other words, $$\begin{bmatrix} 1 & 1 \\ -1 & 1 \end{bmatrix}, \begin{bmatrix} 1 & -1 \\ 1 & 1 \end{bmatrix}, \text{ or } \begin{bmatrix} -1 & 1 \\ 1 & 1 \end{bmatrix}$$

can also be used as an encoding matrix for STBC encoding. Alternately, it is possible to generate variations of the encoding matrices described earlier by negating any one of the encoding matrix described by Eq. 1 and the rotated versions of the matrix in Eq. 1. Thus, the alternate STBC encoding matrices may be represented as $$\begin{bmatrix} -1 & -1 \\ -1 & 1 \end{bmatrix}, \begin{bmatrix} -1 & -1 \\ 1 & -1 \end{bmatrix}, \begin{bmatrix} -1 & 1 \\ -1 & -1 \end{bmatrix}, \text{ and } \begin{bmatrix} 1 & -1 \\ -1 & -1 \end{bmatrix}.$$

Similarly, the data symbols are also encoded using STBC techniques. Thus, the transmitted symbols are denoted with the following:

At Transmitter 1: $s_1$ and $-s^*_2$

At Transmitter 2: $s_2$ and $s^*_1$

In the above symbol notations, $s^*_k$ represents a conjugate of the $k^{th}$ symbol transmitted at the transmitter. Typically, the same two symbols are transmitted by the two transmit chains. The format (e.g., order of transmission, conjugated symbols, etc.) in which the symbols are transmitted depends on the STBC encoding matrix. Also, symbols $s_k$ can be training symbols or data symbols.

The symbols received by the receive chains (two receive chains in this example) are acquired at block 502 and are described by a set of equations indicated by Eqs. 2. In Eqs. 2, $r_j(k)$ represents the $k^{th}$ received symbol at the $j^{th}$ receive antenna and $h_{i,j}$ represents the channel coefficients between the $i^{th}$ transmit chain and the $j^{th}$ receive chain. The flow continues at block 504.

$$\left.\begin{array}{l} r_1(1) = h_{11}s_1 - h_{21}s^*_2 \\ r_2(1) = h_{12}s_1 - h_{22}s^*_2 \\ r_1(2) = h_{11}s_2 + h_{21}s^*_1 \\ r_2(2) = h_{12}s_2 + h_{22}s^*_1 \end{array}\right\} \qquad \text{Eqs. 2}$$

At block 504, a maximum ratio combining (MRC) is performed on the received symbols. Maximum ratio combining is a diversity combining technique, which allows RF signals received by multiple receive chains to be optimally combined. Using maximum ratio combining techniques, each received signal is weighted such that the weight is proportional to the strength of the received signal. In some implementations, the channel coefficients may be the weights applied to the symbols. An MRC unit performs operations described by a set of equations denoted by Eqs. 3 and determines MRC outputs for the two symbols acquired from each receive chain. In the following equations, $y_j(k)$ represents the MRC output for the $k^{th}$ symbol at the $j^{th}$ receive chain. $h^*$ is a conjugate of the channel coefficients.

$$\left.\begin{array}{l} y_1(1) = h^*_{11}r_1(1) + h^*_{12}r_2(1) \\ y_2(1) = h^*_{21}r_1(1) + h^*_{22}r_2(1) \\ y_1(2) = h^*_{11}r_1(2) + h^*_{12}r_2(2) \\ y_2(2) = h^*_{21}r_1(2) + h^*_{22}r_2(2) \end{array}\right\} \qquad \text{Eqs. 3}$$

In general, Eqs. 4 describe MRC operations for two receive chains, where n is a positive integer. The flow continues at block 506.

$$\left.\begin{array}{l} y_1(k) = h^*_{11}r_1(k) + h^*_{12}r_2(k) \\ y_2(k) = h^*_{21}r_1(k) + h^*_{22}r_2(k) \end{array}\right\} k = 2n, 2n+1 \qquad \text{Eqs. 4}$$

At block 506, a previous phase offset estimate is applied to the MRC outputs (determined at block 504). The phase offset estimate is determined using two symbols from each receive chain. The determined phase offset estimate is applied to the MRC outputs for two subsequent symbols. If the corrected MRC outputs for the $k^{th}$ symbol at the $j^{th}$ receive chain is denoted by $z_j(k)$, then a set of equations denoted by Eqs. 5 describe the operations for phase offset correction.

$$\left.\begin{array}{l} z_1(k) = y_1(k) \cdot e^{\left(-j\theta(k-2) + \frac{2\pi\rho(k-2)}{N}\right)} \\ z_2(k) = y_2(k) \cdot e^{\left(-j\theta(k-2) + \frac{2\pi\rho(k-2)}{N}\right)} \end{array}\right\} k = 2n, 2n+1 \qquad \text{Eqs. 5}$$

In Eqs. 5, $$e^{\left(-j\theta(k-2) + \frac{2\pi\rho(k-2)}{N}\right)}$$

is the overall phase offset. $\theta(k-2)$ is the phase offset caused by carrier frequency offset and is determined by calculating an angle of a combination of two subsequent received symbols from each receive chain. $\rho(k-2)$ is the timing offset introduced by sampling clock frequency offset at the $(k-2)^{th}$ symbol. In one variation, the timing offset ($\rho$) can be determined from the carrier frequency offset ($\Delta fc$) and the symbol period (T), as indicated in Eq. 6.

$$\rho = T \cdot \Delta fc \qquad \text{Eq. 6}$$

In general, compensated MRC outputs for the $k^{th}$ symbol, at the $j^{th}$ receive chain, and in the $p^{th}$ bin are expressed by Eq. 7. A bin is an OFDM frequency sub-carrier. It is possible that during transmission, the communication channel may affect different frequency sub-carriers differently and independent of other sub-carriers. Also, phase effects (phase distortions, errors, etc.) may be different for different bins. Therefore, phase offset estimates can be computed for different bins and applied to the bins while they are being decoded in parallel. The flow continues at block 508.

$$z_{i,p}(k) = y_{i,p}(k) \cdot e^{\left(-j\theta(k-2) + \frac{2\pi(p)p(k-2)}{N}\right)}, \text{ where } \begin{array}{l} k = 2n, 2n+1 \\ 1 = 1, 2 \end{array} \quad \text{Eq. 7}$$

At block 508, STBC decoding is performed on the phase offset compensated MRC outputs (determined at block 506). The four compensated MRC outputs (in Eq. 5) are combined to retrieve the best estimates of the transmitted symbols. This operation is described by a set of equations denoted by Eq. 8. $\hat{s}_k$ is an estimate of the $k^{th}$ transmitted symbol. Pt is the power determined using the channel estimates and is calculated using Eq. 9. In Eq. 9, $|h_{i,j}|$ is the magnitude of the channel coefficient between the $i^{th}$ transmit chain and the $j^{th}$ receive chain, $\sigma_{noise}^2$ is the noise variance, and $\sigma_{data}^2$ is the variance of the data symbols. Typically, $\sigma_{data}^2$ is 1. In some instances, the noise can be assumed to be a zero mean Gaussian random variable. In other implementations, the noise distribution can be determined via simulations of the communication channel. In some implementations, instead of weighting (i.e., dividing by Pt) the decoded symbols, the MRC outputs (determined at block 504) or the phase offset compensated MRC outputs (determined at block 506) may be weighted. The flow continues at block 510.

$$\left.\begin{array}{l} \hat{s}_1 = \dfrac{y_1(1) + y_2^*(2)}{Pt} \\ \hat{s}_2 = \dfrac{y_1(2) + y_2^*(1)}{Pt} \end{array}\right\} \quad \text{Eqs. 8}$$

$$P_t = \frac{[|h_{11}|^2 + |h_{12}|^2 + |h_{21}|^2 + |h_{22}|^2] \cdot \sigma_{data}^2}{\sigma_{noise}^2} \quad \text{Eq. 9}$$

At block 510, a phase offset estimate is determined using the STBC decoded symbols. The compensated MRC outputs (determined at block 506) are used to determine an estimate of the phase offset. The phase offset estimate is calculated using Eq. 10. A generalized version of the phase offset is described in Eq. 11, where p is the OFDM frequency bin. The phase offset estimate determined at block 510 (using symbols k and k+1) is used to decode the next two symbols (k+2, k+3). The negative signs in Eq. 10 and Eq. 11 are due to STBC encoding. The STBC encoding applied is known in advance. It should be noted that the equations described in Eq. 10 and Eq. 11 are examples and the position of the negative sign is dependent on the STBC encoding matrix applied at the transmitter. The negative sign (depicted in Eq. 10 as preceding element $Z_2(k+1)$) may precede one or more of other elements in Eq. 10 and Eq. 11, depending on the encoding matrix applied at the transmitter. From block 510, the flow ends.

$$\text{Est.phase} = \arg(Z_1(k) + Z_1(k+1) + Z_2(k) - Z_2(k+1)) \quad \text{Eq. 10}$$

$$\text{Est.phase} = \arg(Z_{1,p}(k) + Z_{1,p}(k+1) + Z_{2,p}(k) - Z_{2,p}(k+1)) \quad \text{Eq. 11}$$

Figure 6:
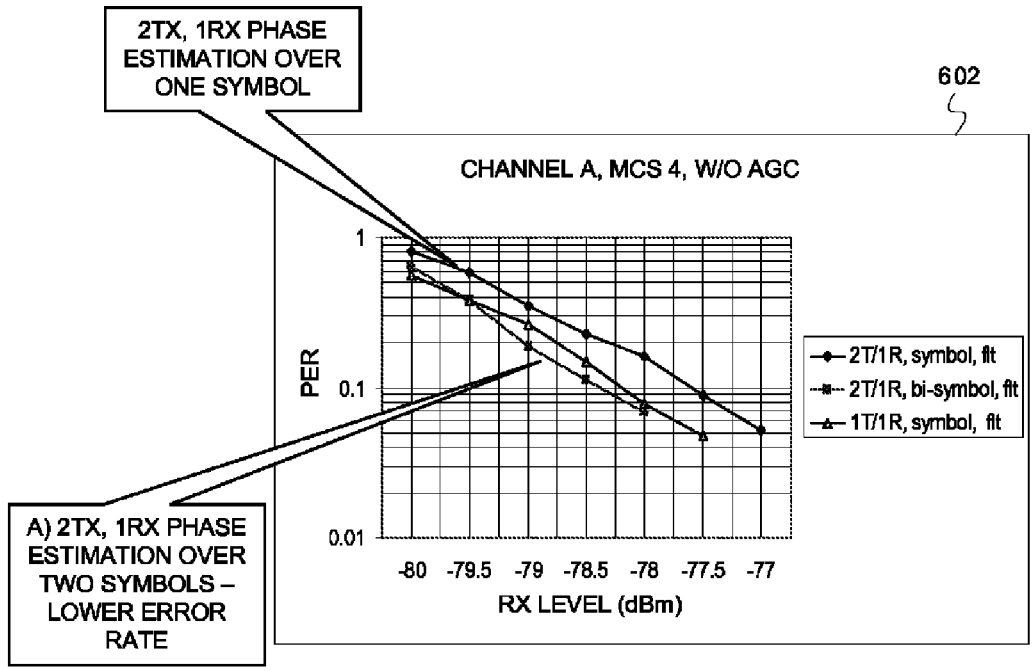
FIG. 6 illustrates a performance comparison between multiple phase offset estimation techniques.
Figure 6:
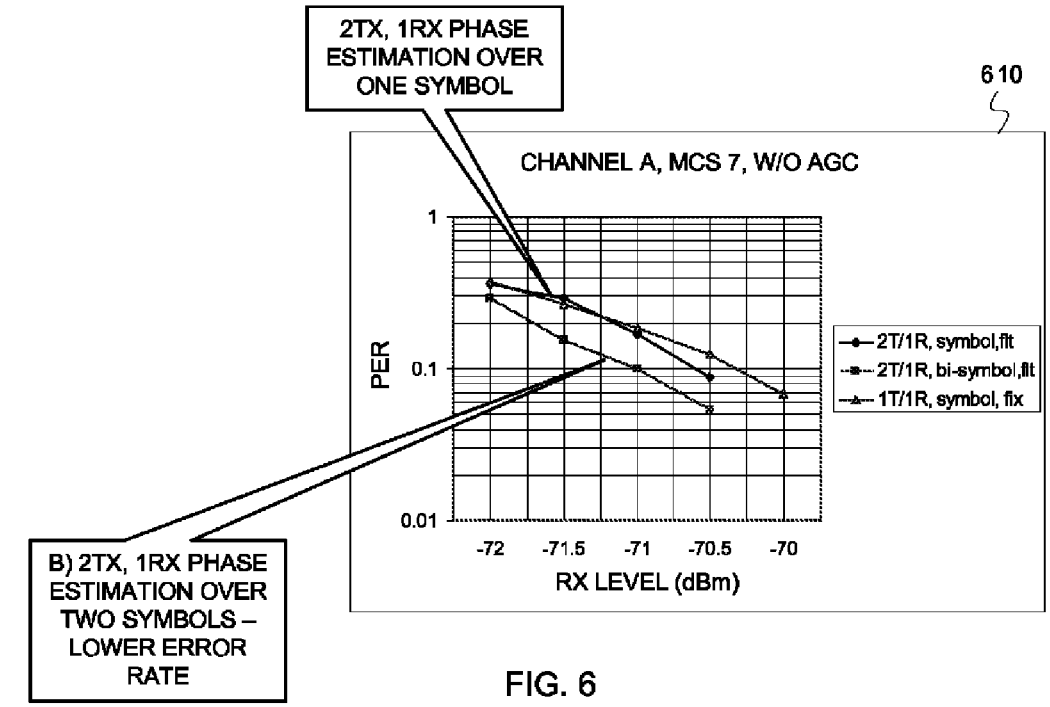

FIG. 6 illustrates a performance comparison between multiple phase offset estimation techniques. As shown in graphs 602 and 610, bi-symbol rate phase offset estimation and correction can improve performance. In Graph 602 (at stage A), for a channel with a modulation and coding scheme (MCS) of 4, bi-symbol phase offset estimation has a better performance and a lower packet error rate as compared to single symbol phase offset estimation. Likewise, in graph 610 (at stage B), for a channel with a modulation and coding scheme of 7, bi-symbol phase offset estimation performs better (i.e., has a lower packet error rate) as compared to single symbol phase offset estimation.

The 802.11n specification describes multiple modulation and coding schemes indicating the type of modulation, coding, and number of spatial channels. For example, packets transmitted with MCS 4 are modulated using 16-QAM and transmitted using two space-time streams and a bandwidth of 20 MHz. Packets with a modulation and coding scheme of 7 are modulated using 64-QAM and transmitted using two space-time streams and a bandwidth of 20 MHz. Multi-symbol phase offset estimation can be applied to wider bandwidths and a higher number of space-time streams using other MIMO systems with different transmission formats.

Embodiments may take the form of an entirely hardware embodiment, a software embodiment (including firmware, resident software, micro-code, etc.) or an embodiment combining software and hardware aspects that may all generally be referred to herein as a "circuit," "module" or "system". Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing ("machine-readable storage medium") or transmitting (machine-readable signal medium") information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in a machine-readable signal medium which can include an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 7:
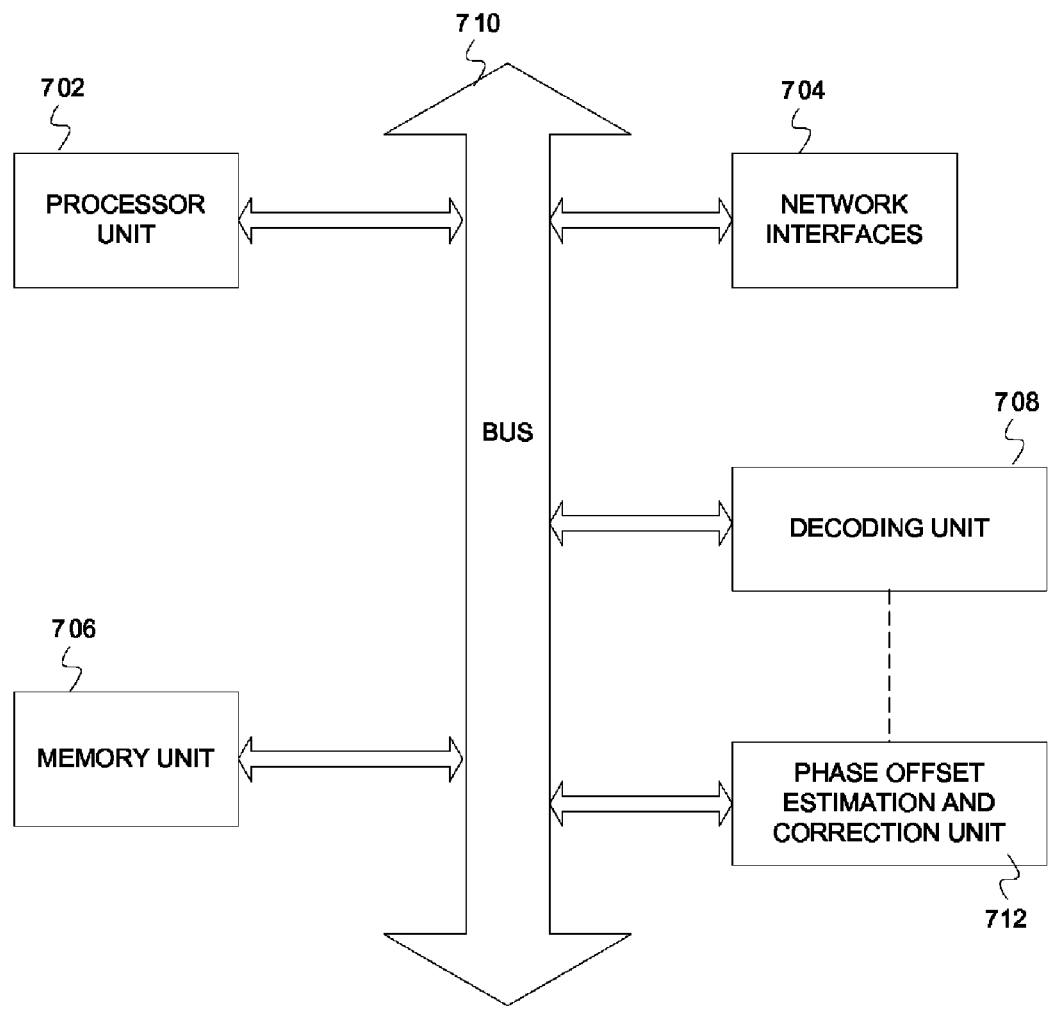
FIG. 7 is a block diagram of one embodiment of a wireless device configured to estimate and correct phase offset.

FIG. 7 is a block diagram of one embodiment of a wireless device configured to estimate and correct phase offset. In one implementation, the wireless device may be a WLAN device. The WLAN device includes a processor unit 702 (possibly including multiple processors, multiple cores, multiple nodes, and/or implementing multi-threading, etc.). The WLAN device includes a memory unit 706. The memory unit 706 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The WLAN device also includes a bus 710 (e.g., PCI, ISA, PCI-Express, HyperTransport®, Infini-Band®, NuBus, etc.), and network interfaces 704 that include at least one wireless network interface (e.g., a WLAN interface, a Bluetooth® interface, a WiMAX interface, a ZigBee® interface, a Wireless USB interface, etc.). The WLAN device also includes a decoding unit 708 coupled with a phase offset estimation and correction unit 712. The decoding unit 708 combines multiple successive symbols from each receive chain to generate estimates of transmitted symbols. Additionally, the phase offset estimation and correction unit 712 combines the multiple successive symbols from each receive chain to determine a phase offset estimate. The determined phase offset estimate is applied in the decoding of multiple subsequent symbols as described above. Any one of the above-described functionalities may be partially (or entirely) implemented in hardware and/or on the processing unit 702. For example, the functionality may be implemented with an application specific integrated circuit, in logic implemented in the processing unit 702, in a co-processor on a peripheral device or card, etc. In addition, a component coupled with the bus 710 may comprise the decoding unit 708 and the phase offset estimation and correction unit 712. Further, realizations may include fewer or additional components not illustrated in FIG. 7 (e.g., additional network interfaces, peripheral devices, etc.). The processor unit 702 and the network interfaces 704 are coupled to the bus 710. Although illustrated as being coupled to the bus 710, the memory 706 may be coupled to the processor unit 702.

While the embodiments are described with reference to various implementations and exploitations, it will be understood that these embodiments are illustrative and that the scope of the inventive subject matter is not limited to them. In general, techniques for multi-symbol phase offset estimation using space-time block codes as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
processing, using maximum ratio combining techniques, a first received symbol from each receive chain of a plurality of receive chains in a receiver, wherein a plurality of received symbols comprises the first received symbol;
processing, using maximum ratio combining techniques, a second received symbol from each receive chain of the plurality of receive chains in a receiver, wherein the plurality of received symbols comprises the second received symbol, and wherein the first received symbol precedes the second received symbol;
adding the processed first and the processed second received symbols from each receive chain of the plurality of receive chains in the receiver to generate a first sum;
computing an angle of the first sum to generate a first phase offset estimate;
acquiring a third received symbol and a fourth received symbol, wherein the plurality of received symbols comprises the third and the fourth received symbols and the first and the second received symbols precede the third and the fourth received symbols;
processing, using maximum ratio combining techniques, the third and the fourth received symbols from each of the plurality of receive chains in the receiver; and
applying, to the third and the fourth processed received symbols, the first phase offset estimate to generate a phase offset compensated third received symbol and a phase offset compensated fourth received symbol.

2. The method of claim 1, wherein the processing, using maximum ratio combining techniques, the first received symbol from each receive chain of the plurality of receive chains in the receiver further comprises weighting the processed symbols based, at least in part, on channel estimates.

3. The method of claim 1, further comprising multiplying the processed first received symbol and the processed second received symbol by a reference phase slope.

4. The method of claim 1, further comprising decoding the phase offset compensated third and fourth received symbols to respectively generate a first and a second estimated transmitted symbols, wherein the decoded phase compensated third received symbol is the first estimated transmitted symbol and the decoded phase compensated fourth received symbol is the second estimated transmitted symbol.

5. The method of claim 1, wherein the processing using maximum ratio combining techniques, the first received symbol from each receive chain of the plurality of receive chains in a receiver further comprises delaying the first received symbol from each receive chain of the plurality of receive chains.

6. The method of claim 1, further comprising:
adding the processed third and the processed fourth received symbols from each receive chain of the plurality of receive chains in the receiver to generate a second sum;
computing an angle of the second sum to generate a second phase offset estimate; and
applying, to a fifth and a sixth received symbol from each receive chain of the plurality of receive chains in a receiver, the second phase offset estimate to generate a phase compensated fifth received symbol and a phase compensated sixth received symbol, wherein the plurality of received symbols comprise the fifth and the sixth received symbols, and are preceded by the first, second, third, and fourth received symbols.

7. One or more machine-readable storage media having stored therein program instructions executable by a set of one or more processor units, the program instructions operable to:
process, using maximum ratio combining techniques, a first received symbol from each receive chain of a plurality of receive chains in a receiver, wherein a plurality of received symbols comprises the first received symbol;

process, using maximum ratio combining techniques, a second received symbol from each receive chain of the plurality of receive chains in a receiver, wherein the plurality of received symbols comprises the second received symbol, and wherein the first received symbol precedes the second received symbol;

add the processed first and the processed second received symbols from each receive chain of the plurality of receive chains in the receiver to generate a first sum;

compute an angle of the first sum to generate a first phase offset estimate;

acquire a third received symbol and a fourth received symbol, wherein the plurality of received symbols comprises the third and the fourth received symbols and the first and the second received symbols precede the third and the fourth received symbols;

process, using maximum ratio combining techniques, the third and the fourth received symbols from each of the plurality of receive chains in the receiver; and apply, to the third and the fourth processed received symbols, the first phase offset estimate to generate a phase offset compensated third received symbol and a phase offset compensated fourth received symbol.

8. The machine-readable storage media of claim 7, wherein the machine-readable storage media further comprise program instructions to multiply the processed first received symbol and the processed second received symbol by a reference phase slope.

9. The machine readable storage media of claim 7, wherein said program instructions to process, using maximum ratio combining techniques, the first received symbol from each receive chain of the plurality of receive chains in a receiver comprises program instructions to delay the first received symbol from each receive chain of the plurality of receive chains.

10. The machine-readable storage media of claim 7, wherein the machine-readable storage media further comprises program instructions to:

add the processed third and the processed fourth received symbols from each receive chain of the plurality of receive chains in the receiver to generate a second sum;

compute an angle of the second sum to generate a second phase offset estimate; and apply, to a fifth and a sixth received symbol from each receive chain of the plurality of receive chains in a receiver, the second phase offset estimate to generate a phase compensated fifth received symbol and a phase compensated sixth received symbol, wherein the plurality of received symbols comprises the fifth and the sixth received symbols, and are preceded by the first, second, third, and fourth received symbols.

11. The machine-readable storage media of claim 7, wherein said program instructions to process, using maximum ratio combining techniques, the first received symbol from each receive chain of the plurality of receive chains in the receiver further comprise program instructions to weight the processed symbols based, at least in part, on channel estimates.

12. The machine-readable storage media of claim 7, wherein the machine-readable storage media further comprise program instructions to decode the phase offset compensated third and fourth received symbols to respectively generate a first and a second estimated transmitted symbols, wherein the decoded phase compensated third received symbol is the first estimated transmitted symbol and the decoded phase compensated fourth received symbol is the second estimated transmitted symbol.

13. A receiver unit comprising:

a plurality f receive chains;

a decoding unit coupled with the processor, the decoding unit comprising a maximum ratio combining unit operable to:

process, using maximum ratio combining techniques, a first received symbol and a second received symbol from each receive chain of the plurality of receive chains in the receiver unit, wherein a plurality of received symbols comprise the first received symbol, the second received symbol, a third received symbol, and a fourth received symbol;

add the processed first and the processed second received symbols from each receive chain of the plurality of receive chains in the receiver unit to generate a first sum;

process, using the maximum ratio combining techniques, the third received symbol and the fourth received symbol from each of the plurality of receive chains in the receiver unit, wherein the first and the second received symbols precede the third and the fourth received symbols;

a phase offset estimation unit coupled with the decoding unit, the phase offset estimation unit operable to compute an angle of the first sum to generate a first phase offset estimate; and a phase correction unit coupled with the decoding unit and the phase offset estimation unit, the phase correction unit operable to apply, to the third and the fourth processed received symbols, the first phase offset estimate to generate a phase offset compensated third received symbol and a phase offset compensated fourth received symbol.

14. The communication device of claim 13, wherein the maximum ratio combining unit operable to process, using maximum ratio combining techniques, the first received symbol and the second received symbol from each receive chain of the plurality of receive chains in the receiver unit further comprises the maximum ratio combining unit operable to weight the processed symbols based, at least in part, on channel estimates.

15. The communication device of claim 13, wherein the phase correction unit is further operable to multiply the processed first received symbol and the processed second received symbol by a reference phase slope.

16. The communication device of claim 13, wherein the decoding unit is further operable to decode the phase offset compensated third and fourth received symbols to respectively generate a first and a second estimated transmitted symbols, wherein the decoded phase compensated third received symbol is the first estimated transmitted symbol and the decoded phase compensated fourth received symbol is the second estimated transmitted symbol.

17. The communication device of claim 13, wherein the maximum ratio combining unit operable to process, using maximum ratio combining techniques, the first received symbol from each receive chain of the plurality of receive chains in the receiver unit further comprises:

the decoding unit comprising a delay unit, the delay unit operable to delay the first received symbol from each receive chain of the plurality of receive chains.

18. The communication device of claim 13, wherein, the maximum ratio combining unit is further operable to add the processed third and the processed fourth received symbols from each receive chain of the plurality of receive chains in the receiver unit to generate a second sum;

the phase offset estimation unit is further operable to compute an angle of the second sum to generate a second phase offset estimate; and the phase correction unit is further operable to apply, to a fifth and a sixth received symbol from each receive chain of the plurality of receive chains in the receiver unit, the second phase offset estimate to generate a phase compensated fifth received symbol and a phase compensated sixth received symbol, wherein the plurality of received symbols comprise the fifth and the sixth received symbols, and are preceded by the first, second, third, and fourth received symbols.

\* \* \* \* \*